Patented Aug. 2, 1927.

1,637,433

UNITED STATES PATENT OFFICE.

VICTOR YNGVE, OF SOUTH ORANGE, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY CELL.

No Drawing.     Application filed January 12, 1925. Serial No. 1,921.

This invention relates to dry cells and more particularly to new and useful improvements in the method of preparing the depolarizing mixture of dry cells.

As well known, the depolarizing mixture of dry cells is usually prepared by intimately mixing together a depolarizer such as manganese dioxide and some carbonaceous or other conducting material such as graphite. The intimate intermixture is accomplished either by stirring together materials that had been ground to the proper degree of fineness, or by milling the manganese ore together with the graphite until the proper fineness is secured. Usually, ammonium chloride and a solution containing zinc chloride with or without ammonium chloride is added to this mixture.

These methods of making dry batteries are not entirely satisfactory. When, in order to avoid separate milling, joint milling of the materials is resorted to, then, owing to the much greater hardness of the manganese ore, the graphite or other carbonaceous material that is being milled with it will be reduced to a finer condition than required for best results. If a mixture of 300 parts of manganese dioxide ore and 100 parts of graphite of suitable grade are milled together, then in the resultant mixture and graphite will be extremely fine, and as a result of this the battery in which such mixture is used will have a lower amperage than would be the case with coarser graphite constituents in the mixture. Furthermore, graphite is bulky material and occupies a volume of mill space equal to that occupied by manganese dioxide of much greater weight.

In order to eliminate the above enumerated disadvantages, in accordance with the present invention a relatively small amount of graphite is milled with manganese ore. Both materials should be in dry condition to insure thorough breaking up of the graphite particles. For example, 380 parts of maganese ore is milled in a ball or pebble mill together with 50 parts of graphite of suitable quality until at least 95% of the mixture passes through a 200 mesh screen. The milled material which is not as yet suitable for use as a battery mixture is then removed from the mill and portions of the milled product are mixed with an additional amount of coarser graphite. A suitable ratio would be 42 parts of milled mixture and 7.5 parts of relatively coarse graphite. The resulting product is then made into a battery mix in accordance with any of the well-known methods.

It will be obvious to those skilled in the art that any variety of manganese dioxide suitable for dry cell use may be substituted for manganese dioxide ore, and that any suitable conducting carbonaceous material may be substituted for the graphite. The ratios of 7.6:1 and 5.6:1, assumed in the above example, give excellent results but may be varied to suit particular requirements.

What I claim is:

1. The method of preparing dry cell mixture which consists in milling together depolarizing and ordinary carbonaceous materials, the latter being less in quantity than is required in the mix, and then adding the balance of the required carbonaceous material in ordinary form to the milled product.

2. The method of preparing dry cell mixture which consists in milling together manganese dioxide and relatively coarse graphite in dry condition, the latter being less in quantity than is required in the mix, and then adding the balance of the required graphite in relatively coarse form to the milled product.

3. The method of preparing dry cell mixture which consists in milling together manganese dioxide ore and a quantity of graphite less than is required for the mixture to comminute the ore and graphite, and then adding some relatively coarse graphite to the milled product.

4. The method of preparing dry cell mixture which consists in milling together to the desired degree of fineness manganese dioxide ore and ordinary graphite, the ratio of said materials being approximately 7.6 to 1, and then adding to the resultant mixture relatively coarse graphite in the ratio of about 5.6 to 1.

5. The method of preparing dry cell mixture which consists in milling together in dry condition 7.6 parts of manganese dioxide ore and one part of ordinary graphite until at last 95% of the mixture will pass through a 200 mesh screen, and then adding to 5.6 parts of the milled mixture one part of realtively coarse graphite.

6. The method of preparing dry cell mixture which comprises mixing together particles of manganese dioxide and graphite of given size, the quantity of graphite being less than is required in the finished mix, milling the mixture to reduce the size of the manganese dioxide and graphite particles and then adding enough relatively coarse graphite to complete the quantity thereof required for the mix.

In testimony whereof I have signed my name to this specification, this ninth day of January, 1925.

VICTOR YNGVE.